United States Patent [19]

Saeger

[11] Patent Number: 5,351,135
[45] Date of Patent: Sep. 27, 1994

[54] MANAGING LETTERBOX SIGNALS WITH LOGOS

[75] Inventor: Timothy W. Saeger, Indianapolis, Ind.

[73] Assignee: Thomson Consumer Electronics, Inc., Indianapolis, Ind.

[21] Appl. No.: 57,026

[22] Filed: May 5, 1993

Related U.S. Application Data

[63] Continuation-in-part of Ser. No. 817,236, Jan. 6, 1992, Pat. No. 5,249,049.

[30] Foreign Application Priority Data

Jun. 1, 1990 [GB] United Kingdom ............... 9012326

[51] Int. Cl.$^5$ .................... H04N 7/04; H04N 7/08; H04N 5/278
[52] U.S. Cl. .................... 348/435; 348/913
[58] Field of Search ............... 358/141, 142, 180, 160, 358/432, 434, 435, 913; H04N 5/46, 5/445, 7/04, 7/08, 5/262, 5/272, 5/278

[56] References Cited

U.S. PATENT DOCUMENTS

| | | | |
|---|---|---|---|
| 4,670,784 | 6/1987 | Goldberg .............................. | 358/141 |
| 4,679,091 | 7/1987 | Kikuchi et al. ..................... | 358/242 |
| 4,760,455 | 7/1988 | Nagashima ......................... | 358/242 |
| 4,761,587 | 8/1988 | Wharton .............................. | 315/408 |
| 4,766,355 | 8/1988 | Kadlec et al. ...................... | 315/399 |
| 4,769,705 | 9/1988 | Lendaro ............................... | 358/158 |
| 5,032,907 | 7/1991 | Isnardi ................................ | 358/141 |
| 5,097,332 | 3/1992 | Faroudja ............................. | 358/141 |
| 5,136,398 | 9/1992 | Rodriguez-Cavazos et al. ... | 358/242 |
| 5,179,443 | 1/1993 | Sugimori et al. ................... | 358/142 |
| 5,208,670 | 5/1993 | Sugimori et al. ................... | 358/141 |
| 5,216,505 | 6/1993 | Kageyama et al. ................ | 358/141 |
| 5,231,491 | 7/1993 | Holoch ................................ | 358/141 |

FOREIGN PATENT DOCUMENTS

| | | | |
|---|---|---|---|
| 63-185173 | 7/1988 | Japan .............................. | H04N 5/46 |
| 179080 | 7/1990 | Japan ............................ | H04N 5/278 |
| 10481 | 1/1991 | Japan .............................. | H04N 7/08 |
| 101575 | 4/1991 | Japan .............................. | H04N 7/08 |
| 4322577 | 11/1992 | Japan ............................. | H04N 5/445 |
| 4361490 | 12/1992 | Japan .............................. | H04N 5/46 |
| 2240002 | 7/1991 | United Kingdom .......... | H04N 7/08 |
| 91/19390 | 12/1991 | World Int. Prop. O. . | |

OTHER PUBLICATIONS

U. S. application Ser. No. 07/817,236 filed Jan. 6, 1992.

*Primary Examiner*—Mark R. Powell
*Assistant Examiner*—Chris Grant
*Attorney, Agent, or Firm*—Joseph S. Tripoli; Joseph J. Laks; Harvey D. Fried

[57] ABSTRACT

A video display control system comprises: a video display having a wide format display ratio; a letterbox detector for sampling video information in pictures represented by input video signals having a letterbox format and generating a control signal for enlarging the pictures for substantially filling the video display means with active video, the letterbox format pictures sometimes having auxiliary information disposed in a border area; and, a circuit for preventing the letterbox detector from sampling the video information in any portion of the border area in which the auxiliary information can be expected to be disposed, when present. In the case of logos, which are generally disposed near or at the right side of the lower border, a horizontal sampling range will exclude the right side of each horizontal line.

20 Claims, 3 Drawing Sheets

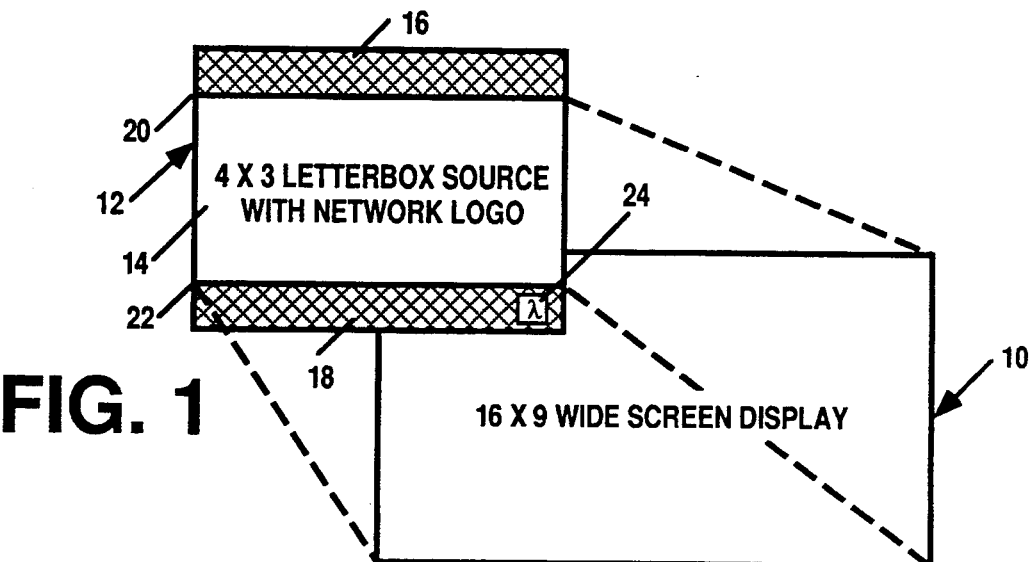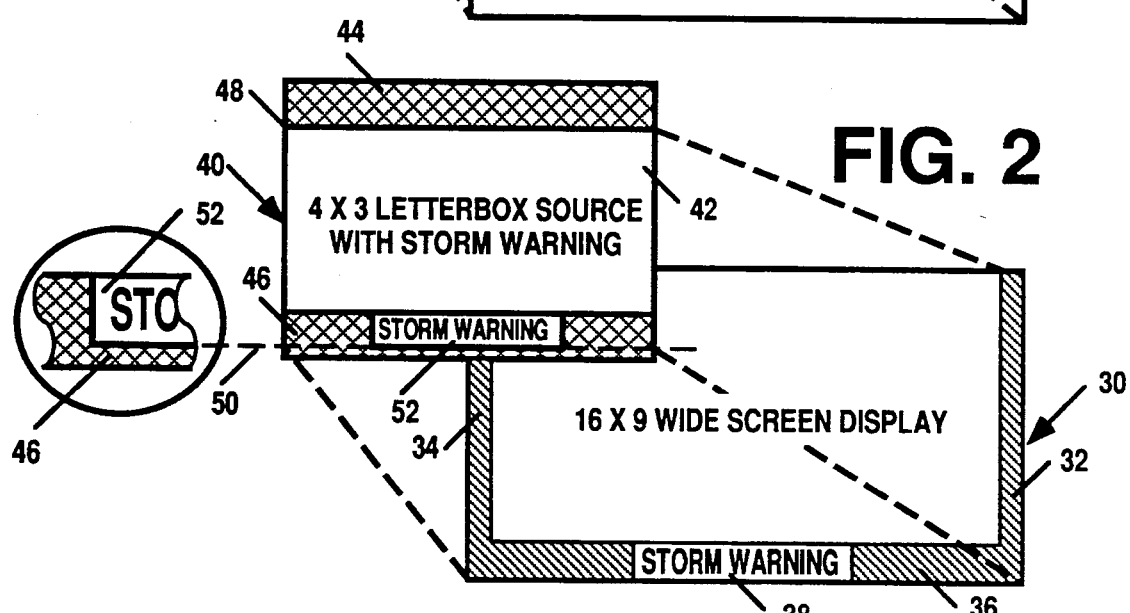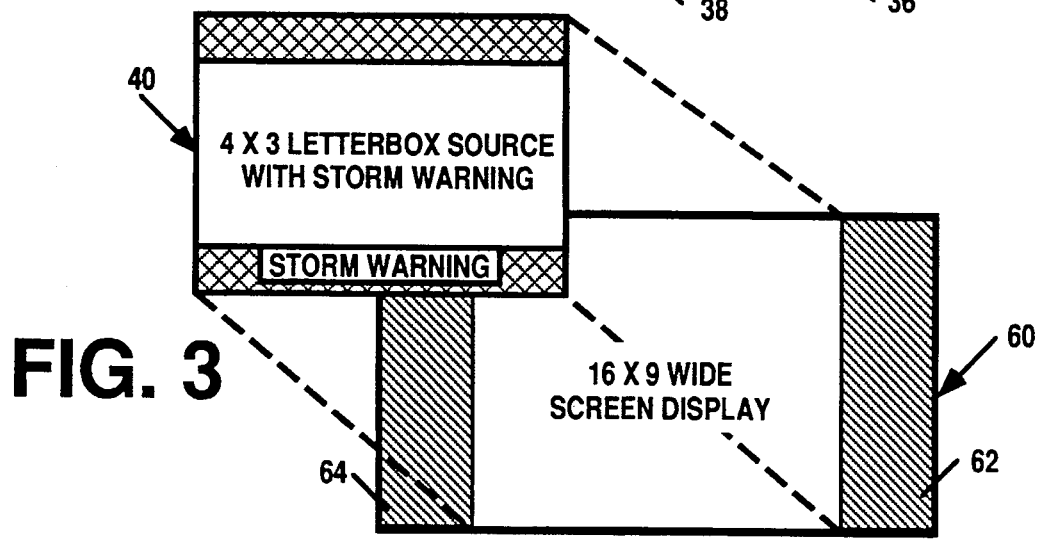

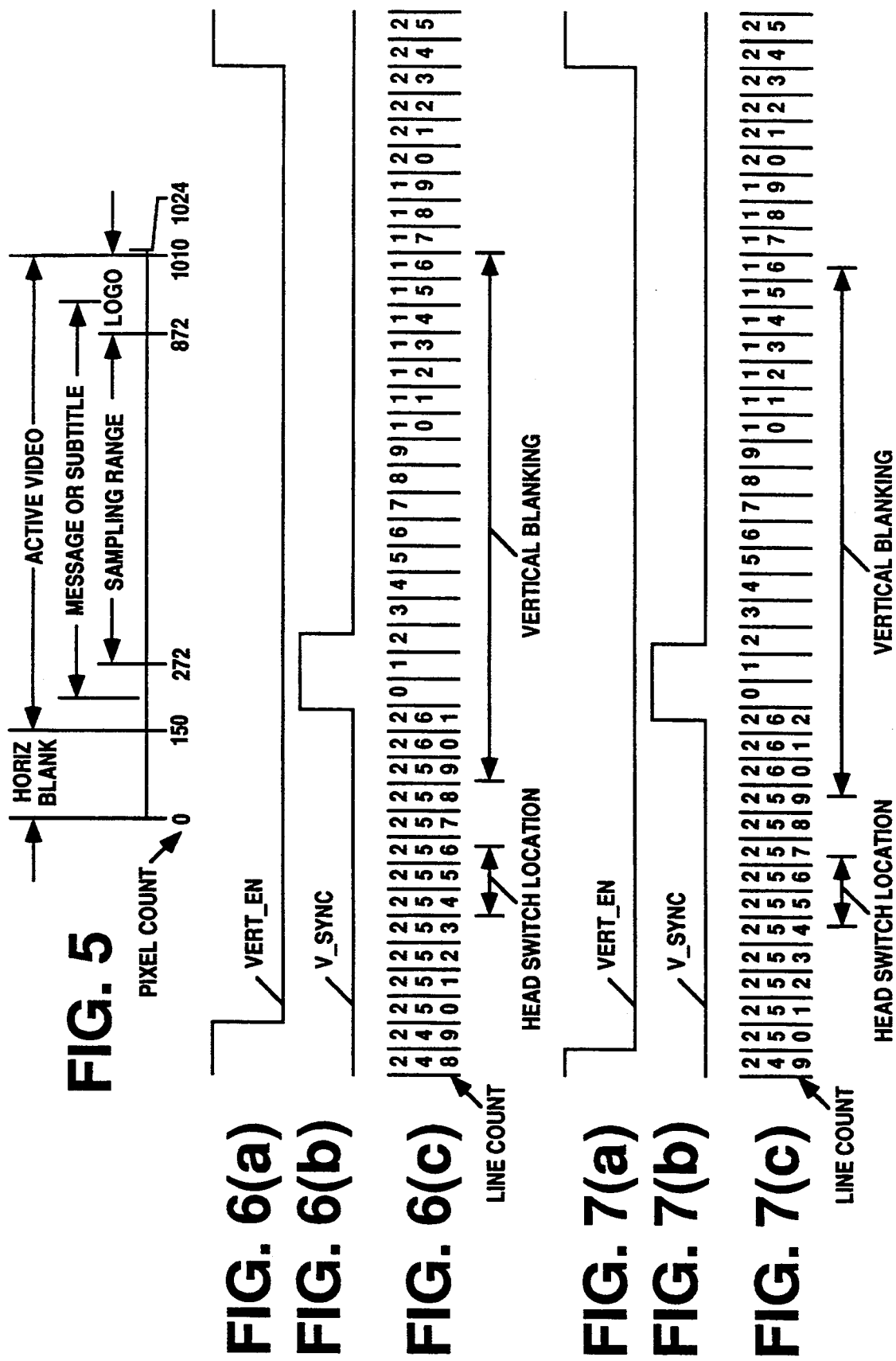

MANAGING LETTERBOX SIGNALS WITH LOGOS

CROSS-REFERENCE TO RELATED APPLICATIONS

This application is a continuation-in-part of copending U.S. application Ser. No. 07/817,236, filed Jan. 6, 1992, now U.S. Pat. No. 5,249,049. Application Ser. No. 07/817,236 is a continuation-in-part of international application no. PCT/US91/03739, filed May 29, 1991, and designating the United States.

BACKGROUND OF THE INVENTION

1. Field of the Invention

This invention relates to the field of automatic detectors for letterbox video sources, for example as would be useful in wide screen televisions.

2. Description of the Art

In "letterbox" format, an image in wide format display ratio, for example 16×9 (also designated 16:9), is displayed across the full width of a narrower format display ratio medium, for example 4×3 (also designated 4:3). Movies in a wide format to be broadcast commercially without distortion or cropping are converted by the broadcaster to letterbox format, to enable display on a conventional receiver screen, for example 4×3. The broadcaster effectively adds blank or matte top and bottom borders, and broadcasts the combined picture and borders in a 4×3 composite image signal. Assuming standard 16×9 and 4×3 ratios, and standard NTSC signals, only 181 horizontal lines in each field are devoted to the main video, the remaining lines being the matte, gray or black borders. The useful picture information, or main video, is generally referred to as active video, whereas the borders are generally referred to as inactive video, even if the borders are flat fields having some luminance value and/or chrominance component. This distinction and designation is followed herein. The borders may be used, if at all, to display different types of auxiliary information. A first type is generally text, such as storm warnings, news alerts and subtitles. A second type includes station and network logos, which are often graphic or a combination of text and graphics. Both types of auxiliary information might be present together, or separately. Both types of auxiliary information are also generally referred to as active video.

When such letterbox displays (in 4×3 format) are shown on a wide screen television, for example 16×9 format, the video signal can be vertically zoomed, that is enlarged, by a factor which both increases the portion of active video to substantially fill the wide screen display, and at the same time, substantially eliminates the upper and lower borders. This can be accomplished without incurring image aspect ratio distortion. It is a useful feature to automatically detect letterbox sources and vertically enlarge the active portion of the video source signal so as to substantially fill the display screen.

An automatic letterbox detector in a wide screen television is disclosed in PCT/US91/03739 (WO 91/19390). As described therein, the uppermost and lowermost active video areas are detected by calculating two gradients for each line in the video field. Four values are required to calculate the two gradients: maximum and minimum values of the current line, and maximum and minimum values of the previous line. The first gradient, designated the positive gradient, is formed by subtracting the minimum value of the previous line from the maximum value of the current line. The second gradient, designated the negative gradient, is formed by subtracting the minimum value of the current line from the maximum value of the previous line. Either of the gradients may have positive or negative values depending on scene content, but the negative values of both gradients may be ignored. This is because only one gradient may be negative at a time, and the magnitude of the gradient with the positive value will always be greater than or equal to the magnitude of the gradient with the negative value. This simplifies the circuitry by eliminating the need to calculate an absolute value of the gradients. If either gradient has a positive value which exceeds a programmable threshold, video is considered to be present on either the current line or on the previous line.

These values can be used by a microprocessor to make a determination of whether or not the video source is in the letterbox format and to determine the first and last line numbers of active video. The calculation can be performed only for the top (or the bottom) of the image, provided means are provided for centering the image vertically. Inasmuch as the detection of active video is a function of gradient rather than luma absolute value, the device can detect inactive borders of a predetermined matte color, provided the borders have a substantial (but unchanging) luminance level. The luminance level detector is enabled for only about 70% of each line in order to improve signal to noise ratios.

However, if the borders are used to display auxiliary material, such as storm warnings, news alerts, subtitles, station or network logos, and the like, the automatic letterbox detector will return operation to the standard, non-zoomed operation. This may be desirable for storm warnings, news alerts and subtitles, but can be a significant nuisance for logos. Moreover, continuous transmission of a logo in the border area of a letterbox source can prevent automatic detection of the source as being letterbox in the first instance.

SUMMARY OF THE INVENTION

The invention overcomes the problem of automatic letterbox detectors erroneously responding to the presence of station and network logos, and the like, while still permitting automatic response to such information as storm warnings, news alerts and subtitles.

A video display control system which overcomes this problem comprises: a video display having a wide format display ratio; a letterbox detector for sampling video information in pictures represented by input video signals having a letterbox format and generating a control signal for enlarging the pictures for substantially filling the video display means with active video, the letterbox format pictures sometimes having auxiliary information disposed in a border area; and, a circuit for preventing the letterbox detector from sampling the video information in any portion of the border area in which auxiliary information such as logos or closed captioning can be expected to be disposed or transmitted, or in which head switching transients can be expected to occur, when present. In the case of logos, for example, which are generally disposed near or at the right side of the lower border, a horizontal sampling range will exclude at least the right side of each horizontal line. In the case of head switching transients and vertical blanking, a circuit will define a vertical sampling range which excludes a number of horizontal lines at the end and at the beginning of each field.

In practice, the letterbox format pictures sometimes have auxiliary information of first and/or second types, as defined above, disposed in a border area. Operation of the letterbox detector is controlled, so as to ignore the second type of information (e.g. logos), if present, but not so as to ignore the first type of information if present, by defining a horizontal sampling range which excludes the range in which logos normally appear but includes at least some of the range in which storm warnings, news alerts, subtitles normally appear. Such a range can be substantially centered with respect to the active video of each horizontal line, but small enough to exclude logos, or any other information, at either end of each horizontal line.

An advantageous embodiment of the invention recognizes that in the majority of instances where logos are present in the border regions of a letterbox signal, such logos are located in the lower right hand corner of the picture, that is, on the right side of the lower border area. Accordingly, the luminance level detector is enabled for examining each line only in sections which are not the right hand portions in which the logos are found. This can be accomplished by sampling approximately 70% of each line, for example, substantially in the middle of each line. In terms of pixels, and assuming that each horizontal line includes 1024 pixels counting from the horizontal synchronizing pulse, 860 of which are active, sampling from approximately pixel 272 through pixel 872 corresponds approximately to 37.2 microseconds of each video line. This will avoid responding to the presence of logos disposed to the left of pixel 272 or to the right of pixel 872, in either the upper or lower border areas. Nevertheless, there is still enough information being sampled to reliably identify letterbox source material, and still improve performance by approximately 1 decibel over results obtained from sampling each horizontal line entirely. In the illustrated embodiment, operation of the letterbox detecting circuit is inhibited during certain horizontal ranges. A control circuit for inhibiting circuit comprises: first and second comparators, responsive to first and second predetermined pixel counts respectively, and both responsive to a running pixel count; and, a flip/flop responsive to each of the comparators, for initiating a letterbox detection enable signal when the running pixel count reaches the first predetermined pixel count and terminating the enable signal when the running pixel count reaches the second predetermined pixel count.

BRIEF DESCRIPTION OF THE DRAWINGS

An automatic letterbox detector in accordance with the is principles of this invention is explained in connection with the drawings, wherein:

FIG. 1 is a diagram illustrating how a conventional video signal in letterbox format, and including a network logo, can be fully enlarged for display on a wide screen television;

FIG. 2 is a diagram illustrating how a conventional video signal in letterbox format, and including a storm warning, can be enlarged to a lesser degree for display on a wide screen television;

FIG. 3 is a diagram illustrating how a conventional video signal in letterbox format, and including a storm warning, can be displayed on a wide screen television without being enlarged;

FIG. 5 is a diagram useful for explaining the horizontal range of operation of the letterbox detector;

FIGS. 6(a), 6(b) and 6(c) are useful for explaining the vertical range of operation of the letterbox detector in a first of successive video fields; and, FIGS. 7(a), 7(b) and 7(c) are useful for explaining the vertical range of operation of the letterbox detector in a second of successive video fields.

DETAILED DESCRIPTION OF THE PREFERRED EMBODIMENTS

Figure 4:
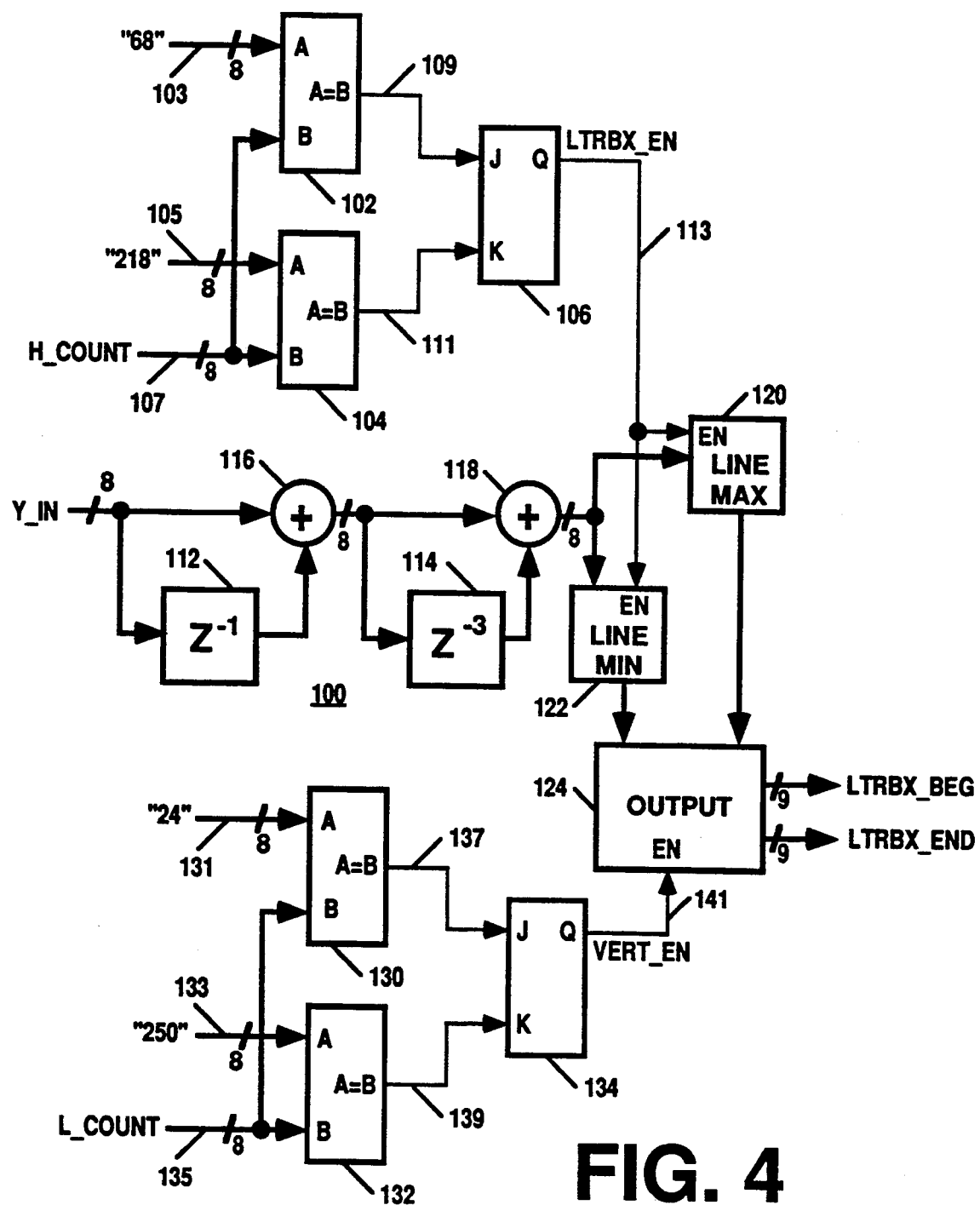
FIG. 4 is a block diagram of an automatic letterbox detection circuit for initiating the fully enlarged display shown in FIG. 1.

An automatic letterbox detector can be used to detect a conventional video signal 12 in letterbox format, as shown in FIG. 1. A signal in letterbox format, also referred to as a letterbox signal or letterboxed signal, has a central area 14 with active video, an upper border area 16 and a lower border area 18. The border areas are typically flat video fields, often black in color. The first line 20 of active video represents a transition from the upper border 16 to the active video area 14. The last line 22 of active video represents a transition from the active video area 14 to the lower border 18. If the video signal 12 has a format display ratio of 4×3, if the active video area has a format display ratio of 16×9, and if a wide screen television has a video display screen 10 with a format display ratio of 16×9, then the active video area 14 can be mapped precisely onto the wide screen display 10 by enlarging the active video area 14 by a factor of 4/3 both horizontally and vertically. Under these circumstances, the flat field border regions 16 and 18 will be effectively eliminated from view. A number of ways are known to implement such enlargement. The actual format display ratio of the active video area 14 may be different in practice from 16×9. In these cases, the mapping will not be precise. A decision must be made, either automatically or responsive to manual control, to fill the wide screen display, even if material is laterally cropped, or to fill the wide screen display vertically, even if lateral borders on each side of the enlarged active video area are visible on the wide screen display.

Letterbox detectors generally detect the absence of active video in one or both to the upper and lower border regions 16 and 18. Such circuit are generally fooled by information which appears in the border areas, such as storm warnings, news alerts, subtitles, station or network logos, and the like. Detection of a storm warning is illustrated in FIG. 2. A video signal 40 in letterbox format has a central area 42 with active video, an upper border area 44 and a lower border area 46. A storm warning 52 is transmitted in the lower border area 46. The first line 48 of active video represents a transition from the upper border 16 to the active video area 14, as in FIG. 1. However, the last line 50 of active video does not represent a transition from the active video area 14 to the lower border 18. Instead, line 50 represents the last line of video in the storm warning, as shown more clearly in the enlarged portion of the storm warning in the left part of FIG. 2. A letterbox detector will determine that the area of active video includes not only area 42, but most of border area 46 as well. This has the effect of making the active video area have an effective format display ratio less than 16×9. In other words, the detected active video area is not as wide, compared to height, as is area 42 alone. In accordance with one of the alternatives noted above, the enlarged picture on the wide screen television 30 has lateral border areas 32 and 34, and the border area 46 which includes the storm warning 50 is displayed as a lower border area 36 having the storm warning in area 38.

Another display for storm warnings and the like is shown in FIG. 3. In this case, video signal 40 is displayed on wide screen television 60 without any enlargement at all, showing the border areas of the letterbox signal and lateral borders 62 and 64 as well.

In the case of storm warnings and other useful messages, either of the alternatives shown in FIGS. 2 and 3, or others, may be appropriate. However, it may not be desirable to operate as shown in FIGS. 2 and 3 when the only information transmitted in the border area is a station or network logo 24, depicted as a lambda (λ) in FIG. 1. A full enlargement is desirable, notwithstanding the logo 24. Most useful information which appears in the border areas of letterbox signals extends horizontally across a substantial portion of the border, whereas most logos are much smaller, and usually placed near the far right hand edge of the lower border, as illustrated by the placement of logo 24. An automatic letterbox detector, which might otherwise undesirably respond to the presence of a logo, can be provided with a mode of operation in which such logos are usually ignored. An automatic letterbox detector which is insensitive to logos is shown in FIG. 4.

Generally, two gradients are calculated for each line in the video field to determine lines of active video. Four values are required to calculate the two gradients: (1) maximum and minimum values of the current line; and (2) maximum and minimum values of the previous line. The first gradient, designated the positive gradient, is formed by subtracting the minimum value of the previous line from the maximum value of the current line. The second gradient, designated the negative gradient, is formed by subtracting the minimum value of the current line from the maximum value of the previous line. Either of the gradients may have positive or negative values depending on scene content, but the negative values of both gradients may be ignored. This is because only one gradient may be negative at a time, and the magnitude of the gradient with the positive value will always be greater than or equal to the magnitude of the gradient with the negative value. This simplifies the circuitry by eliminating the need to calculate an absolute value of the gradients. If either gradient has a positive value which exceeds a programmable threshold, video is considered to be present on either the current line or on the previous line. These values can be used by a microprocessor to determine the first and last lines of active video and thereby to determine the particular aspect ratio of the active area of the signal. This determination defines whether or not the video source is in the letterbox format, and enables the further calculation of the extent of change to the deflection circuit and the resolution circuits needed to convert the displayed signal as required.

A circuit 100 for implementing a letterbox detector which is insensitive to the presences of logos is shown in block diagram form in FIG. 4. The circuit 100 comprises a luminance input filter, a line maximum (LINE MAX) detector 120, a line minimum (LINE MIN) detector 122, and an output section 124. The luminance input filter comprises finite impulse response (FIR) stages 112 and 114, as well as adders 116 and 118, The letterbox detection circuit 100 operates on digitized luminance data Y_IN. The input filter is utilized in order to improve noise performance and make detection more reliable. The filter is essentially two cascaded FIR stages, having a transfer function as follows:

$$H(z) = \tfrac{1}{4} * (1 + Z^{-1}) * (1 + Z^{-3}).$$

The output of each stage is truncated to eight bits (divided by two) to maintain a DC gain of one.

The LINE MAX detector 120 includes two registers. The first register contains the maximum pixel value (MAX PIX) at the current point in the line period. It is initialized at the beginning of every line period to a value of 80 h. The value of 80 h represents the minimum possible value for an eight bit number in two's complement format (the most significant bit being the sign). The circuit is enabled by a signal, designated LTRBX_EN, which goes high for approximately 70% of the active video line. The second register contains the maximum pixel value (MAX LINE) for the entire previous line, and is updated once per line period. Incoming luminance data Y_IN is compared to the current maximum pixel value stored in the MAX PIX register. If it exceeds the register value, the MAX PIX register is updated on the next clock cycle. At the end of the video line, MAX PIX register will contain the maximum value over the entire portion of the line for which it was enabled. At the beginning of the next video line, the value of the MAX PIX register is loaded into the MAX LINE register and the MAX PIX register is reloaded with 80 h.

The line minimum detector 122 works in an identical manner except that a MIN LINE register will contain the minimum pixel value for the previous line. A MIN PIX value is initialized to a value of 7 Fh, which is the maximum possible pixel value for an eight bit number in the two's complement format.

The output section 124 will take the MAX LINE register value and the MIN LINE register value, and store them in eight-bit latches that are updated once per line. Two gradients are then calculated, namely the positive gradient and the negative gradient. On the first line in a field where either of these gradients is positive and greater than a programmable threshold, an enable signal is generated which allows a first line register to be loaded with the current line count value. On every line where either of the gradients is positive and exceeds the programmable threshold, another enable signal is generated which allows a last line register to be loaded with the current line count value. In this manner the last line register will contain the last line in the field where the threshold was exceeded. At the beginning of every field, the circuit is reinitialized, and the values in the first line and last line registers are loaded into respective letterbox end registers. The LTRBX_BEG and LTRBX_END signals represent those line numbers which mark the beginning and end respectively of a letterbox signal, and can be used as control signals for enlarging the picture, either by signal processing techniques, manipulation of the deflection circuits or some combination thereof.

Generation of the LTRBX_EN signal, which enables operation of the line maximum and line minimum detectors 120 and 122 is controlled to avoid responding to logos in the border areas. The LTRBX_EN signal is generated by comparators 102 and 104 and J-K flip/flop 106. Each horizontal line is deemed to have 1024 pixels, for purposes of illustration, as shown in FIG. 5. The first 150 pixels, counted from the horizontal synchronizing pulse, occur during horizontal blanking. The next 860 pixels are active pixels, so that the active video extends from pixel 151 through pixel 1010. Pixels 1011 through 1024 represent the front porch of the video signal, and are also not deemed active video. Moreover, each pixel or pixel position is assumed to be represented by a ten-bit number. Comparator 102 has an A input on line 103 which represents a first pixel. Comparator 104 has an A input on line 105 which represents a second pixel. The B input of each of the comparators 102 and 104, on line 107, is a signal representing a running pixel count H_COUNT, which represents the output of a pixel counter, not shown, operating for example at 1024$f_H$. In order to simplify hardware requirements, the signal H_COUNT is the eight most significant bits of a ten-bit number, which is the equivalent of dividing the ten-bit number by four. The fixed pixel count inputs to the comparators must therefore also be one-fourth of the desired value. Accordingly, number "68" on line 103 actually represents a pixel with four times that value, namely pixel "272". Similarly, number "218" on line 105 also represents a pixel with four times that value, namely pixel "872". As a result, the sampled or tested portion of each line is substantially centered, ignoring the portion of each line corresponding to horizontal blanking, with approximately 150 pixels on each side not being tested. In each horizontal line tested, approximately 600 pixels out of 860 pixels of active video are sampled, approximately 70% of those pixels having active video information.

When H_COUNT reaches "68" an output on line 109 sets the J-K flip/flop 106 and the Q output goes high, generating the LTRBX_EN signal to permit operation of detectors 120 and 122. When H_COUNT reaches "218" an output on line 111 resets the J-K flip/flop 106 and the Q output goes low, inhibiting the LTRBX_EN signal and preventing the operation of detectors 120 and 122. Letterbox detection is thereby enabled for each video line only after a delay of approximately 16.8 microseconds from the horizontal synchronizing signal. Letterbox detection for each video line is disabled approximately 9.4 microseconds before the end of each video line. This provides enough video data processing for reliable detection of letterbox signals, and at the same time, ignores all video information in the areas most likely to contain only logos. Storm warnings, subtitles and other useful information will still be detected, for the purpose of modifying the otherwise substantially fully enlarged wide screen display.

Video cassette recorders utilizing the VHS format, or any VCR of the helical scan type, will insert a head switching transient, which might be mistaken for active video, anywhere from 5–8 lines prior to the vertical synchronizing signal (V_SYNC), causing incorrect letterbox detection. In addition, it is useful to determine the full extent of any interference which may be caused by the vertical blanking interval and any further auxiliary information which might be contained therein, such as closed captioning information. In order to avoid false detections based on closed captioning information and on VCR head switching transients, the outputs of the LINE MAX and LINE MIN registers 120 and 122 are prevented from being loaded into the nine-bit latches of the output section 124 by an enable signal which is allowed to occur only in a range of horizontal lines in each field which avoids the regions of head switching transients and vertical blanking, for example between horizontal lines 24 and 250 of each field.

A circuit for controlling a signal, designated VERT_EN in FIG. 4, for enabling loading of the nine-bit latches in the output section 124, is formed by comparators 130 and 132, a J-K flip/flop 134, and a horizontal line counter, not shown. The line counter can be cleared in such a way that successive fields are quantized into 262 and 263 lines respectively. In other words, line 0 begins on the horizontal synchronizing signal immediately following the leading edge of the vertical synchronizing signal V_SYNC. The beginning value of VERT_EN can be set to a line count of 24 and the end value can be set to a line count of 250. This eliminates interference during the vertical blanking interval, which can extend from three lines before V_SYNC, or a line count of 250, to 14 lines after V_SYNC, or a line count of 16. This also eliminates any interference from head switching transients, which can occur from five to eight line before V_SYNC, or a line count of 254 to 257.

The foregoing relationships are illustrated in the drawings. FIGS. 6(a), 6(b) and 6(c) show the VERT_EN signal, the V_SYNC signal and the horizontal line count for a first of two successive fields, quantized to 262 horizontal lines designated "0" through "261". The VERT_EN signal is disabled from line 250 until line 24, 36 lines in all. FIGS. 7(a), 7(b) and 7(c) show the VERT_EN signal, the V_SYNC signal and the horizontal line count for a second of two successive fields, quantized to 263 horizontal lines designated "0" through "262". The VERT_EN signal is also disabled from line 250 until line 24, but for 37 lines, because the second field is one line longer. The additional line, designated line "262", occurs during vertical blanking.

Referring again to FIG. 4, comparator 130 has an A input on line 131 which represents a first horizontal line count, for example "24". Comparator 132 has an A input on line 133 which represents a second horizontal line count, for example "250". The B input of each of the comparators 102 and 104, on line 107, is a signal representing a running horizontal line count L_COUNT, which represents the output of a horizontal line counter, not shown.

When L_COUNT reaches "24" an output on line 137 sets the J-K flip/flop 134 and the Q output goes high, generating the VERT_EN signal to permit loading of the latches in the output circuit 124. When L_COUNT reaches "250" an output on line 139 resets the J-K flip/flop 1134 and the Q output goes low, preventing the latches in output circuit 124 from being loaded Letterbox detection is thereby enabled only for video lines not having head switching transients or during vertical blanking. Letterbox detection is enabled by this part of the circuit 100 for a majority of the active video lines in each field, providing enough lines of video data for reliable detection of letterbox signals.

The automatic letterbox detector described herein may be operable at all times, or may be operable whenever automatic letterbox detection is selected manually as a mode of operation, or may be available as one of a plurality of letterbox detection modes of operation, when automatic letterbox detection in general is selected.

What is claimed is:
1. A video display control system, comprising:
   a video display means having a wide format display ratio;
   a letterbox processor for determining when a picture represented by an input video signal has a letterbox format, said letterbox format picture sometimes having auxiliary information disposed in a border area; and, means for controlling operation of said letterbox processor to ignore a certain type of said auxiliary information when present.

2. A video display control system, comprising:

a video display means having a wide format display ratio;

a letterbox processor for determining when a picture represented by an input video signal has a letterbox format, said letterbox format picture sometimes having auxiliary information disposed in a border area, a first type of said auxiliary information disposed in a first horizontal range of said border area and a second type of said auxiliary information disposed in a second horizontal range of said border area, at least partly exclusive of said first range; and, means for controlling operation of said letterbox processor being controlled to ignore said first type of said auxiliary information when present.

3. The system of claim 2, wherein said controlling means inhibits a determination of whether said input video signal has said letterbox format responsive to said first type of said auxiliary information.

4. The system of claim 2, wherein said controlling means enables a determination of whether said input video signal has said letterbox format only during horizontal scanning in that part of said second range at least partly exclusive of said first range.

5. The system of claim 2, wherein said means for controlling operation of said letterbox processor comprises pixel counting means for initiating a letterbox detection enable signal at a first pixel count and terminating said enable signal at a second pixel count defining a sampling range exclusive of said first horizontal range.

6. A video display control system, comprising:

a video display means having a wide format display ratio;

a letterbox processor for determining when a picture represented by an input video signal has a letterbox format, said letterbox format picture sometimes having auxiliary information disposed in a border area; and, means for controlling operation of said letterbox processor to inhibit a determination of whether said input video signal has said letterbox format responsive to a type of said auxiliary information which is likely to be positioned, when present, in a first horizontal range not coincident with a substantial portion of a second and larger horizontal range in which another type of said auxiliary information is likely to appear, when present.

7. A video display control system, comprising:

a video display means having a wide format display ratio;

a letterbox processor for determining when a picture represented by an input video signal has a letterbox format, said letterbox format picture sometimes having auxiliary information disposed in a border area; and, means for controlling operation of said letterbox processor to enable a determination of whether said input video signal has said letterbox formats responsive to a type of said auxiliary information which is likely to be positioned, when present, in a first horizontal range, only a small part of which may be coincident when coincident at all, with a second and smaller horizontal range, in which another type of said auxiliary information is likely to appear, when present.

8. A video display control system, comprising:

a video display means having a wide format display ratio;

a letterbox processor for determining when a picture represented by an input video signal has a letterbox format, said letterbox format picture sometimes having auxiliary information disposed in a border area; and, pixel counting means for controlling operation of said letterbox processor to ignore a certain type of said auxiliary information, when present, by initiating a letterbox detection enable signal at a first pixel count and terminating said enable signal at a second pixel count.

9. A video display control system, comprising:

a video display means having a wide format display ratio;

a letterbox processor for determining when a picture represented by an input video signal has a letterbox format, said letterbox format picture sometimes having auxiliary information disposed in a border area; and, means for controlling operation of said letterbox processor to ignore a certain type of said auxiliary information when present, said controlling means comprising:

means for generating a running pixel count;

means for comparing first and second predetermined counts to said running pixel count; and, means responsive to said comparing means for generating a letterbox detection enable signal when said running pixel count is between said first and second predetermined counts.

10. A video display control system, comprising:

a video display means having a wide format display ratio;

means for determining when a picture represented by an input video signal is indicative of said picture having a letterbox format in which an active video portion of said picture is positioned between upper and lower border areas, said letterbox format picture sometimes having auxiliary information positioned in different portions of said border areas;

means responsive to said letterbox determining means for enlarging said picture in size to substantially fill said video display means with said active video portion when said input video signal is determined to have said letterbox format; and, means for inhibiting said determining means from responding to one type of said auxiliary information by restricting operation of said determining means to a predetermined portion of said border areas likely to exclude said one type of said auxiliary information, when present.

11. A video display system, comprising:

a video display means having a wide format display ratio;

means for determining when a picture represented by an input video signal is indicative of said picture having a letterbox format in which an active video portion of said picture is positioned between upper and lower border areas, said letterbox format picture sometimes having auxiliary information positioned in different portions of said border areas;

means responsive to said letterbox determining means for enlarging said picture in size to substantially fill said video display means with said active video portion when said input video signal is determined to have said letterbox format; and, means for inhibiting said determining means from responding to one type of said auxiliary information by enabling operation of said determining means in a predetermined horizontal range of each horizontal line of said input signal likely to exclude said one type of said auxiliary information, when present.

12. The system of claim 11, wherein said predetermined horizontal range is substantially horizontally centered with respect to said tested horizontal lines.

13. The system of claim 12, wherein said range extends over approximately 70% of each of said tested horizontal lines.

14. A video display control system, comprising:
a video display means having a wide format display ratio;
means for determining when a picture represented, by an input video signal is indicative of said picture having a letterbox format in which an active video portion of said picture is positioned between upper and lower border areas, said letterbox format picture sometimes having auxiliary information positioned in different portions of said border areas;
means responsive to said letterbox determining means for enlarging said picture in size to substantially fill said video display means with said active video portion when said input video signal is determined to have said letterbox format; and,
pixel counting means for inhibiting said determining means from responding to one type of said auxiliary information by initiating a letterbox detection enable signal at a first pixel count and terminating said enable signal at a second pixel count to restrict operation of said determining means to a predetermined portion of said border areas likely to exclude said one type of said auxiliary information, when present.

15. The system of claim 14, wherein said first and second pixel counts are predetermined.

16. A video display control system comprising:
a video display means having a wide format display ratio;
means for determining when a picture represented by an input video signal is indicative of said picture having a letterbox format in which an active video portion of said picture is positioned between upper and lower border areas, said letterbox format picture sometimes having auxiliary information positioned in different portions of said border areas;
means responsive to said letterbox determining means for enlarging said picture in size to substantially fill said video display means with said active video portion when said input video signal is determined to have said letterbox format; and, means for inhibiting said determining means from one type of said auxiliary information by restricting operation of said determining means to a predetermined portion of said border areas likely to exclude said one type of said auxiliary information, when present, said inhibiting means comprising:
means for generating a running pixel count;
means for comparing first and second predetermined counts to said running pixel count; and,
means responsive to said comparing means for generating a letterbox detection enable signal when said running pixel count is between said first and second predetermined counts.

17. The system of claim 16, wherein:
said comparing means comprises first and second comparators, responsive to said first and second predetermined pixel counts respectively, and both responsive to said running pixel count; and,
said means responsive to said comparing means comprises a flip/flop responsive to each of said comparators, for initiating said letterbox detection enable signal when said running pixel count reaches said first predetermined pixel count and terminating said enable signal when said running pixel count reaches said second predetermined pixel count.

18. The system of claim 17, wherein each of said first and second pixel counts and said running pixel count represent a fraction of an actual pixel count.

19. A video display control system, comprising:
a video display means having a wide format display ratio;
a letterbox detector for sampling video information in pictures represented by input video signals having a letterbox format and generating a control signal for enlarging said pictures for substantially filling said video display means with active video, said letterbox format pictures sometimes having auxiliary information disposed in a border area; and,
means for preventing said letterbox detector from sampling said video information in any portion of said border area in which said auxiliary information can be expected to be disposed, when present.

20. A video display control system, comprising:
a video display means having a wide format display ratio;
a letterbox detector for sampling video information in pictures represented by input video signals having a letterbox format and generating a control signal for enlarging said pictures for substantially filling said video display means with active video, said letterbox format pictures sometimes having auxiliary information disposed in a border area; and,
means for preventing said letterbox detector from sampling said video information in any portion of said border area in which said auxiliary information can be expected to be disposed, when present, by initiating a letterbox detection enable signal at a first pixel count and terminating said enable signal at a second pixel count.

* * * * *

UNITED STATES PATENT AND TRADEMARK OFFICE
CERTIFICATE OF CORRECTION

PATENT NO. : 5,351,135

DATED : September 27, 1994

INVENTOR(S) : Timothy W. Saeger

It is certified that error appears in the above-identified patent and that said Letters Patent is hereby corrected as shown below:

In column 12, line 1, after "determining means from" add --responding to--

Signed and Sealed this

Twentieth Day of June, 1995

Attest:

BRUCE LEHMAN

Attesting Officer

Commissioner of Patents and Trademarks